US011734199B2

(12) United States Patent
Lemay et al.

(10) Patent No.: US 11,734,199 B2
(45) Date of Patent: Aug. 22, 2023

(54) ENFORCING MEMORY OPERAND TYPES USING PROTECTION KEYS

(71) Applicant: Intel Corporation, Santa Clara, CA (US)

(72) Inventors: Michael Lemay, Hillsboro, OR (US); David A Koufaty, Portland, OR (US); Ravi L. Sahita, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 18/074,232

(22) Filed: Dec. 2, 2022

(65) Prior Publication Data

US 2023/0112707 A1 Apr. 13, 2023

Related U.S. Application Data

(60) Continuation of application No. 17/133,734, filed on Dec. 24, 2020, now abandoned, which is a division of (Continued)

(51) Int. Cl.
*G06F 12/14* (2006.01)
*G06F 21/53* (2013.01)
(Continued)

(52) U.S. Cl.
CPC .......... *G06F 12/1466* (2013.01); *G06F 21/53* (2013.01); *G06F 21/566* (2013.01);
(Continued)

(58) Field of Classification Search
CPC .. G06F 21/53; G06F 12/1009; G06F 12/1466; G06F 2009/45583; G06F 12/14;
(Continued)

(56) References Cited

U.S. PATENT DOCUMENTS 6,282,583 B1 * 8/2001 Pincus .............. G06F 15/17337
713/375
6,775,779 B1 * 8/2004 England .................. G06F 21/57
713/193

(Continued)

FOREIGN PATENT DOCUMENTS

WO 2018063644 A1 4/2018

OTHER PUBLICATIONS

"U.S. Appl. No. 15/282,954, Advisory Action dated Jan. 21, 2020", 5 pgs.

(Continued)

*Primary Examiner* — Lizbeth Torres-Diaz
(74) *Attorney, Agent, or Firm* — Jaffery Watson Mendonsa & Hamilton LLP

(57) ABSTRACT

Enforcing memory operand types using protection keys is generally described herein. A processor system to provide sandbox execution support for protection key rights attacks includes a processor core to execute a task associated with an untrusted application and execute the task using a designated page of a memory; and a memory management unit to designate the page of the memory to support execution of the untrusted application.

14 Claims, 9 Drawing Sheets

Related U.S. Application Data application No. 15/282,954, filed on Sep. 30, 2016, now Pat. No. 10,884,952.

(51) Int. Cl.
*G06F 21/56* (2013.01)
*G06F 12/1009* (2016.01)

(52) U.S. Cl.
CPC .. *G06F 12/1009* (2013.01); *G06F 2212/1052* (2013.01); *G06F 2221/034* (2013.01)

(58) Field of Classification Search
CPC .. G06F 21/78; G06F 2221/2149; G06F 21/74; G06F 2009/45587; G06F 3/0637; G06F 9/30101; G06F 2221/034
See application file for complete search history.

(56) References Cited

U.S. PATENT DOCUMENTS

| | | | | |
|---|---|---|---|---|
| 7,210,009 | B2* | 4/2007 | Gulick | G06F 21/79 |
| | | | | 713/193 |
| 7,278,030 | B1* | 10/2007 | Chen | G06F 12/1466 |
| | | | | 711/201 |
| 8,683,114 | B2* | 3/2014 | Zbiciak | G06F 13/366 |
| | | | | 711/163 |
| 9,256,552 | B2* | 2/2016 | Epstein | G06F 12/14 |
| 9,852,084 | B1* | 12/2017 | Soderquist | G06F 12/1009 |
| 9,904,632 | B2* | 2/2018 | Johnson | G06F 21/6218 |
| 10,191,680 | B2* | 1/2019 | Kirshenbaum | G06F 3/0622 |
| 10,691,618 | B2 | 6/2020 | Xing et al. | |
| 10,810,305 | B2* | 10/2020 | Zhang | G06F 21/54 |
| 10,884,952 | B2 | 1/2021 | LeMay et al. | |
| 10,915,457 | B2* | 2/2021 | Wallach | G11C 11/1673 |
| 10,942,863 | B2* | 3/2021 | Wallach | G06F 12/1491 |
| 11,029,957 | B1* | 6/2021 | Sahita | G06F 9/30145 |
| 11,055,402 | B2* | 7/2021 | Acar | G06F 12/145 |
| 2003/0084256 | A1* | 5/2003 | McKee | G06F 12/1491 |
| | | | | 711/206 |
| 2003/0182571 | A1 | 9/2003 | Hashimoto et al. | |
| 2004/0177342 | A1* | 9/2004 | Worley, Jr. | G06F 21/575 |
| | | | | 717/121 |
| 2006/0026385 | A1* | 2/2006 | Dinechin | G06F 12/1036 |
| | | | | 711/206 |
| 2006/0294288 | A1* | 12/2006 | Seth | G06F 12/1441 |
| | | | | 711/6 |
| 2007/0266214 | A1 | 11/2007 | Ohyama | |
| 2009/0172332 | A1* | 7/2009 | Ono | G06F 12/1425 |
| | | | | 711/163 |
| 2011/0277038 | A1 | 11/2011 | Sahita et al. | |
| 2015/0186659 | A1 | 7/2015 | Leslie-Hurd et al. | |
| 2015/0350206 | A1 | 12/2015 | Shin et al. | |
| 2016/0110298 | A1* | 4/2016 | Koufaty | G06F 21/52 |
| | | | | 726/28 |
| 2016/0350019 | A1 | 12/2016 | Koufaty et al. | |
| 2016/0364341 | A1 | 12/2016 | Banginwar et al. | |
| 2016/0364559 | A1 | 12/2016 | Bali et al. | |
| 2017/0097896 | A1* | 4/2017 | Molnar | G06F 12/145 |
| 2018/0095902 | A1 | 4/2018 | LeMay et al. | |
| 2018/0341774 | A1* | 11/2018 | Yao | G06F 21/44 |
| 2019/0042733 | A1* | 2/2019 | Zhang | G06F 21/52 |
| 2019/0129867 | A1* | 5/2019 | Zhang | G06F 21/78 |
| 2019/0196977 | A1* | 6/2019 | Cong | G06F 12/10 |
| 2020/0057664 | A1* | 2/2020 | Durham | G06F 21/53 |
| 2020/0073821 | A1* | 3/2020 | Wallach | G06F 21/53 |
| 2020/0134208 | A1* | 4/2020 | Pappachan | G06F 12/1441 |
| 2020/0186350 | A1* | 6/2020 | Wentz | G06F 21/62 |
| 2020/0311268 | A1* | 10/2020 | Kostyushko | G06F 21/561 |
| 2021/0109870 | A1* | 4/2021 | Sahita | G06F 12/1491 |
| 2021/0117343 | A1* | 4/2021 | Lemay | G06F 21/566 |
| 2021/0200858 | A1* | 7/2021 | Caspi | G06F 21/6218 |

OTHER PUBLICATIONS

"U.S. Appl. No. 15/282,954, Final Office Action dated Oct. 11, 2019", 12 pgs.
"U.S. Appl. No. 15/282,954, Non Final Office Action dated May 14, 2020", 16 pgs.
"U.S. Appl. No. 15/282,954, Non Final Office Action dated May 24, 2019", 12 pgs.
"U.S. Appl. No. 15/282,954, Notice of Allowance dated Aug. 31, 2020", 12 pgs.
"U.S. Appl. No. 15/282,954, Response filed Feb. 5, 2019 to Restriction Requirement, dated Dec. 11, 2018", 9 pgs.
"U.S. Appl. No. 15/282,954, Response filed Aug. 14, 2020 to Non Final Office Action dated May 14, 2020", 9 pgs.
"U.S. Appl. No. 15/282,954, Response filed Dec. 11, 2019 to Final Office Action dated Oct. 11, 2019", 12 pgs.
"U.S. Appl. No. 15/282,954, Response filed Aug. 15, 2019 to Non-Final Office Action dated May 24, 2019", 12 pgs.
"U.S. Appl. No. 15/282,954, Restriction Requirement dated Dec. 11, 2018", 5 pgs.
"International Application Serial No. PCT US2017 048928, International Preliminary Report on Patentability dated Apr. 11, 2019", 15 pgs.
"International Application Serial No. PCT US2017 048928, International Search Report dated Dec. 5, 2017", 3 pgs.
"International Application Serial No. PCT US2017 048928, Written Opinion dated Dec. 5, 2017", 13 pgs.
"SafeStack-Clang 7 documention", [online] http: clang.livm.org docs SafeStack.html Accessed on Apr. 20, 2018, 3 pgs.
Guido, Dan, "Code Pointer Integrity", Vimeo Online https: vimeo.com album 3063779 video 113531905, (Accessed on May 2, 2018), 3 pgs.

* cited by examiner

ENFORCING MEMORY OPERAND TYPES USING PROTECTION KEYS

PRIORITY APPLICATION

This application is a continuation of U.S. application Ser. No. 17/133,734, filed Dec. 24, 2020, which is a divisional of U.S. application Ser. No. 15/282,954, filed Sep. 30, 2016, now issued as U.S. Pat. No. 10,884,952, all of which are incorporated herein by reference in their entirety.

BACKGROUND

Application programs may include unintended bugs that attempt to access regions of the memory that should not be accessed (referred to as stray accesses). Accesses may include writing and reading in the memory, and the stray accesses include stray write and stray read. To prevent the stray accesses from accessing or corrupting memory in unintended ways, certain memory protection mechanisms may be needed.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Certain details are set forth below to provide a sufficient understanding of embodiments of the disclosure. However, it will be clear to one skilled in the art that embodiments of the disclosure may be practiced without various aspects of these particular details. In some instances, well-known circuits, control signals, timing protocols, computer system components, and software operations have not been shown in detail in order to avoid unnecessarily obscuring the described embodiments of the disclosure.

Figure 1:
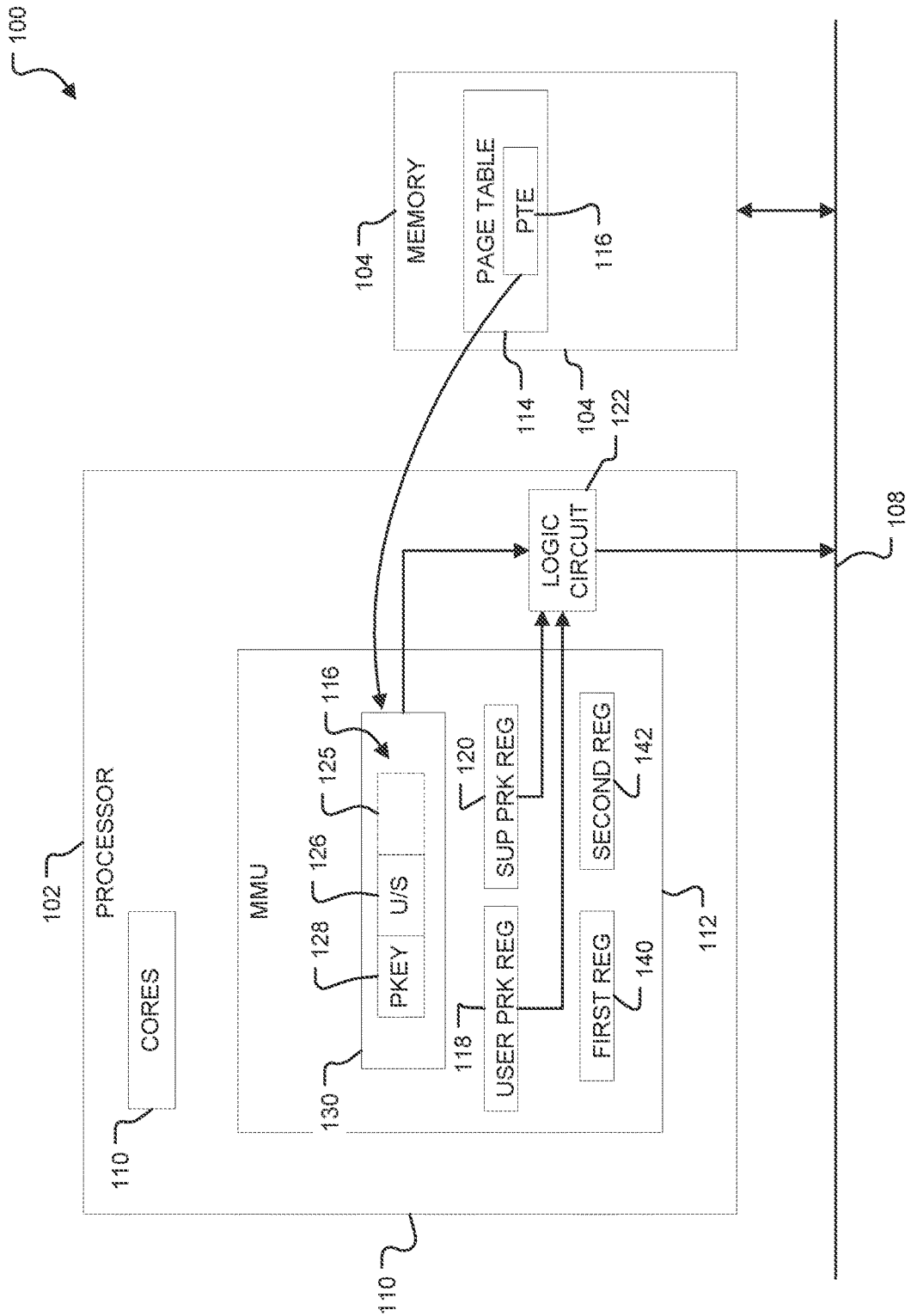
FIG. 1 illustrates a computer system to provide sandbox execution support for protection key rights attacks according an embodiment of the present disclosure.

FIG. 1 illustrates a computer system 100 to provide sandbox execution support for protection key rights attacks according to an embodiment of the present disclosure. The system 100 may include a processor (such as central processing units (CPU)) 102 coupled to a memory 104 via a bus system 108. The memory 104 may store of system application and user application instructions and the data associated with the applications. The processor 102 may execute tasks, such as the system applications or the user applications using the memory 104 to store the instructions of the programs and data associated with the programs. In some examples, the processor 102 may execute tasks such as untrusted system applications or untrusted user applications using sandbox locations (e.g., pages) of the memory 104 to store the instructions and data associated with the untrusted applications in order to protect the processor system 100 from harm that may be caused by the untrusted applications, intentionally or otherwise. The processor may be support a 32-bit mode, a 64-bit mode, or combinations thereof.

The processor 102 may include one or more processing cores 110 and a memory management unit (MMU) 112. The one or more processing cores 110 may be the engines that execute tasks associated with applications. The tasks executed on processing cores 110 may access a virtual memory through virtual addresses (e.g., linear addresses). The memory management unit 112, coupled between the processing cores 110 and the memory 104, may map the virtual addresses of the virtual memory to the physical addresses of the memory 104. The space of virtual addresses may be divided into fixed sized units called pages. A page of the virtual addresses may be mapped correspondingly into fixed-sized units of the physical addresses of the memory 104 called memory frames.

The memory 104 may include a page table 114 for storing mappings between pages of virtual addresses to physical addresses. The mappings may be the mapping between page identifiers to memory frames identifiers. The memory frame identifiers may determine the region of the memory 104 allocated to a task.

The virtual address page table 114 may include one or more page table entries (PTEs) 116 (e.g., leaf nodes of the page tables). A page table entry 116 of the page table 114 may be loaded into a translation lookaside buffer entry 130 of the memory management unit 112 for the memory management unit 112 to perform memory address mapping. Each of the page table entries may store one or more memory frame identifiers that are identified according to virtual address page identifiers. A task executing on the processing cores 110 may allocate a block of memory by specifying one or more virtual address ranges. The memory management unit 112 may use the virtual address page identifier to identify a memory frame identifier stored in the page table entry 116, and may form a physical address for accessing the memory 104 based on the memory frame identifier. The physical address corresponding to the virtual address may be stored in a buffer.

The memory management unit 112 may include logic to check the memory access permission for the task to prevent certain types of memory accesses (e.g., those caused by stray accesses). A page table entry 116 may include one or more status bits to indicate certain page access statuses that need to be checked before mapping the page numbers in page table entry to memory frame numbers. In one embodiment, one of the status bits in each page table entry 116 is a memory access mode status bit U/S 126 to indicate if the page belongs to the user type or the supervisor type. The page table entry 116 may further include a protection key section 128 to store a protection key (e.g., domain) selected by the operating system for the page table entry 116 at the time of its creation. In one embodiment, the operating system may select the protection key from a set of existing protection keys available to the operating system. For example, there may be sixteen protection keys available for the operating system to select, and the operating system may select one that is designated as the next available protection key. In one embodiment, a protection key is a string of binary bits (e.g., 4 bits) that is used as an identifier to retrieve a set of memory access permissions stored in one or more permission registers.

In one embodiment, the memory management unit 112 may include a user protection key rights (PKR) register 118 and a supervisor PKR register 120. The user PKR register 118 may include a number of fields that each store a set of memory access permissions (e.g., PKRs) for a set of user pages, and the supervisor PKR register 120 may include a number of fields that each storing a memory access permissions (e.g., PKRs) for a set of supervisor pages. In one embodiment, the protection key 128 stored in a page table entry 116 may identify a particular permission stored in a field of the user PKR register 118 or a field in the supervisor PKR register 120. For example, the protection key 128 may be an index to the field that stores the PKRs of each of the PKR registers 118 and 120. Therefore, each set of PKRs stored in the user PKR register 118 and the supervisor PKR register 120 may be uniquely retrieved according the protection key 128 and the user or supervisor memory access mode of the page U/S 126 in the page table entry 116.

The set of permissions included in the PKRs may include a first bit to indicate whether read access (AD) is enabled or disabled, a second bit to indicate whether write access (WD) is enabled or disabled, and a third bit to indicate whether execution access (XD) is enabled or disabled.

In some examples, the PKRs stored in the user PKR register 118 and the supervisor PKR register 120 may be available for update with little security protection to allow more efficient updating of PKRs with little overhead involvement from the operating system. Thus, an untrusted application may update a PKR associated with a non-authorized page in the user PKR register 118 or the supervisor PKR register 120, which may then allow the untrusted application to access (e.g., read from or write to) the non-authorized page. To this end, allowing execution of an untrusted application may expose the system 100 to an attack that includes modifying PKRs access unauthorized memory pages.

One method of vetting untrusted applications includes using a sandbox. A sandbox may include one or more pages in the memory 104 designated or set aside to support execution of an untrusted application, with an intent to restrict the untrusted application from accessing other pages of the memory 104. Thus, the "sandbox" refers to these one or more pages of the memory 104 that are effectively isolated or set aside for execution of the untrusted application. As previously described, one way to restrict access may include setting at least one of the AD (e.g., to prevent all access), WD (e.g., to prevent writes/allow reads), or XD (e.g., to prevent code fetches and eliminate a need for bounds checking instructions before branches while in the sandbox) bits in PKRs of the user PKR register 118 or the supervisor PKR register 120 associated with non-authorized/protected pages of the memory 104. The AD, WD, and/or XD bits of the PKRs associated with the sandbox pages may remain cleared to allow the untrusted application to execute properly within those pages. However, as previously described, the untrusted application could modify the PKRs for the non-authorized/protected pages of the memory 104, and then access the non-authorized/protected pages. Instruction pages of the memory 104 that are included in the sandbox may be given a dedicated domain (e.g., protection key 128) number and the XD bit in the associated PKR included in the user PKR register 118 or the supervisor PKR register 120 may be set for all pages having domains (e.g., protection keys 128) other than the dedicated domain number.

To protect against modification of PKRs, the processor 102 may include a first register 140 and a second register 142. In one example, the first register 140 and the second register 142 may include PKR update masks that align with bits of the PKRs in the user PKR register 118 and the supervisor PKR register 120, respectively. The PKR update masks included in the first register 140 and the second register 142 may limit or preclude update of certain individual bits of the PKRs included in the user PKR register 118 or the supervisor PKR register 120. The first register 140 and the second register 142 may require higher-level access permissions in order to be modified, preventing an untrusted application from modifying the PKR update masks. In an example, instruction pages included in the sandbox may be given a dedicated domain (e.g., protection key 128) number and the XD bit in the associated PKR included in the user PKR register 118 or the supervisor PKR register 120 may be set for all pages having domains (e.g., protection keys 128) other than the dedicated domain number.

In an additional embodiment update PKRs when entering and exiting sandbox execution, the PTEs 116 may include a field 125 that indicates when the PKR update masks included in the first register 140 and the second register 142 should be applied (e.g., when the field 125 is set). In some examples, the field 125 may be set (e.g., enabling application of the PKR update masks) prior to beginning execution of an untrusted application, in the sandbox and may be cleared (e.g., disabling application of the PKR update masks) upon completion of execution of the untrusted application.

In an additional embodiment update PKRs when entering and exiting sandbox execution, the PTEs 116 may include a field 125 that indicates when the PKR update masks included in the first register 140 and the second register 142 should be applied (e.g., when the field 125 is set). In some examples, a code segment descriptor may include a field that indicates when the PKR update masks included in the first register 140 and the second register 142 should be applied (e.g., when the field in the code segment descriptor is set). In some embodiments, a code segment descriptor may directly include the PKR update mask that should be applied to code in that segment. For example, both of the preceding embodiments can be used in conjunction with code segment entrypoint control to require that a particular entrypoint is used for a code segment that is authorized to update PKR entries. In another example, a range registers may be used to specify memory address ranges when the PKR update masks included in the first register 140 and the second register 142 should be applied. In some examples, the field 125 may be set (e.g., enabling application of the PKR update masks) prior to beginning execution of an untrusted application, in the sandbox and may be cleared (e.g., disabling application of the PKR update masks) upon completion of execution of the untrusted application.

Figure 3:
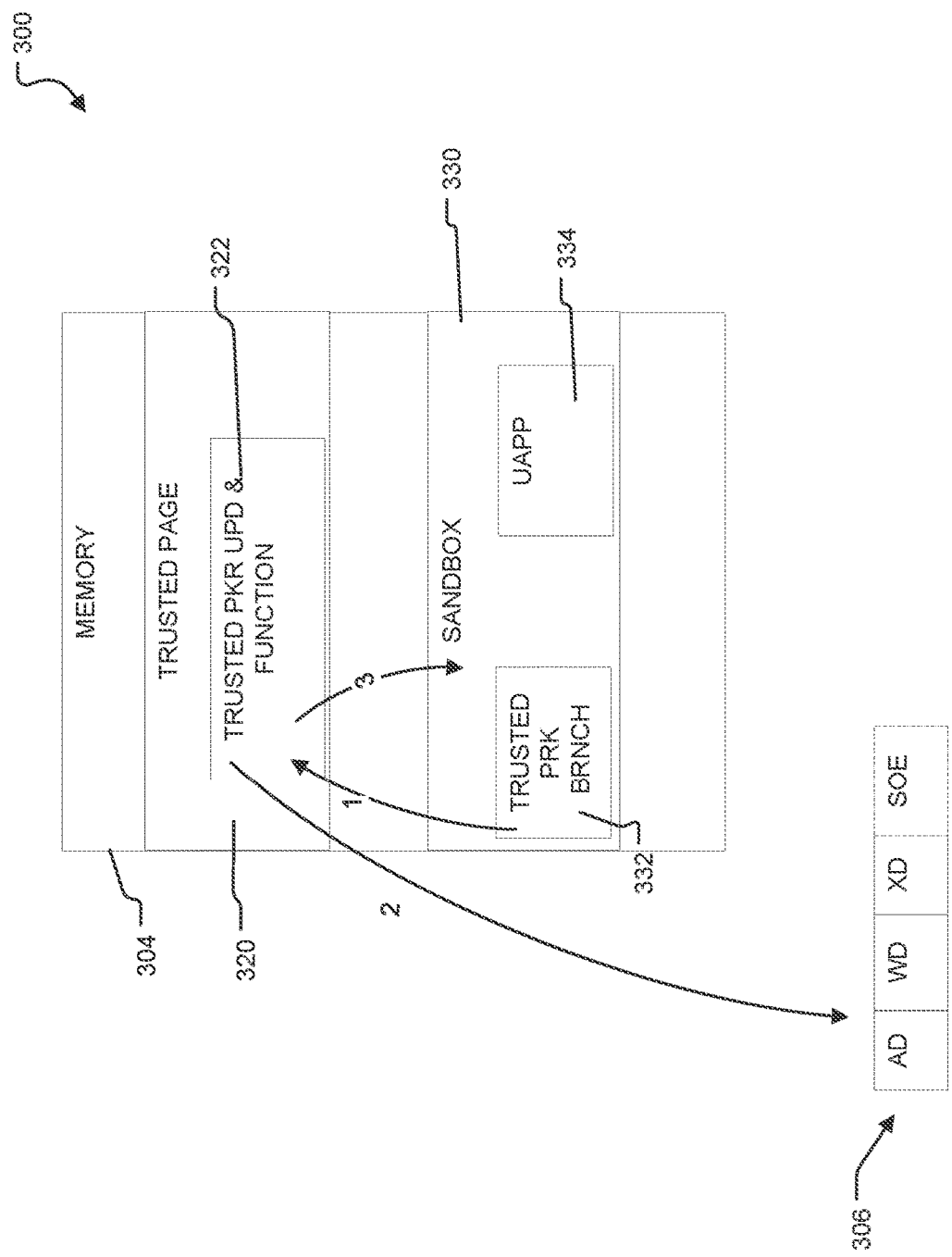
FIG. 3 illustrates an example branch flow for using a branch to a trusted entry point for clearing PKR bits in accordance with some embodiments of the disclosure.

In another example to improve efficiency of updating PKRs when executing in the sandbox, the sandbox may include trusted instructions branch to a trusted entry point outside the sandbox to increase access permissions by clearing PKRs included in the user PKR register 18 or the supervisor PKR register 120 to perform a function allocated to a memory page outside the sandbox, and upon completion of the function, to reassert the cleared PKRs before returning to the untrusted application. The trusted instructions may be constructed to branch to a trusted code entry point outside the sandbox without allowing the branch to be influenced by any register or memory location that is controlled by the untrusted application in the sandbox. FIG. 3 illustrates an example branch flow 300 for using a branch to a trusted entry point for clearing PKR bits in accordance with some embodiments of the disclosure. In the example depicted in FIG. 3, the memory 304 includes a trusted page 320 and a sandbox page 330. The trusted page 320 includes a PKR update instruction and a trusted function 322. The sandbox page 330 may include a trusted PKR branch 332 to the PKR update instruction and a trusted function 322. In a first step, the trusted PKR branch 332 may branch to the PKR update instruction and a trusted function 322. In a second step, the PKR update instruction and a trusted function 322 may clear the PRK, perform the trusted function, and reassert the PKR bits. In a third step, the PKR clear instruction 322 may branch back to the sandbox 330.

In another example to improve efficiency of updating PKRs when entering and exiting sandbox execution, the previously mentioned field 125 and the first register 140 or the second register 142 may alternatively (e.g., rather than the field 125 being a PKR mask enable and the registers 140 and 142 storing PKR masks) be used to specify one or more trusted PKR update pages of the memory 104 that are permitted to update PKRs of the user PKR register 118 or the supervisor PKR register 120. In this example, the field 125 may indicate that PKR updates are only permitted from the trusted PKR update pages identified in the first register 140 or the second register 142. The one or more trusted PKR update pages may include instructions to update the PKRs, and then a branch back to a trusted code entry point outside the sandbox without allowing the branch to be influenced by any register or memory location that is controlled by the entrusted code of the sandbox. That is, branches to the one or more trusted PKR update pages from the sandbox would be denied, and branches from the one or more trusted PKR update pages to the sandbox would be denied. The one or more trusted PKR update pages may be made more robust by also requiring that all branches (e.g., direct and indirect) end/land on an ENDBRANCH (e.g., or similar) instruction.

A third example to improve efficiency of entering and exiting sandbox execution may include creating a new system function (SYSFUNC) instruction that manipulates guest state associated with the operating system. The leaf function may be defined for the new SYSFUNC instruction to update one or more bits of the PKRs in the user PKR register 118 or the supervisor PKR register 120, and then branch to a specific instruction pointer (e.g., EIP for 32 bit/x86 and RIP for 64-bit).

In another embodiment, the sandbox code can be scanned to verify that it does not contain prohibited instructions, such as RDPKRU and WRPKRU, that may permit the sandbox to bypass the sandbox restrictions. This requires preventing the sandbox from dynamically creating new executable code and running that code without verification. This also requires limiting the sandbox control flow, so that all possible instructions that may be executed in the sandbox may be inspected and verified prior to execution.

In another embodiment, rather than defining a sandbox at a memory page level, a micro-sandbox may be implemented by distinguishing between instructions/operands that are safe or unsafe. For example, a compiler may designate instructions/operands that are safe and the processor core 110 may enforce the permissions. In this embodiment, the PKRs could be modified to check specific attributes based on an effective segment of an operand that generated a load or store operation. In some implementations, operands may have an effective address and an effective segment attribute associated with the address that determines permissions for accessing the effective address. One or more effective segment attributes (e.g., CS, DS, ES, FS, GS, and SS), may be used to enable or disable access to pages marked with a particular domain. The one or more attributes may be defined to block all accesses through the corresponding segment (e.g., analogous to AD), or to block a particular type of access (e.g., only writes, analogous to WD). Conversely, a PKR bit could be defined for each segment or each item in a subset of segments, or for each item in a set of specific access types for specific segments, that overrides disable bit settings (e.g. AD and WD) to permit accesses with the corresponding type and effective segment of a set override bit.

In a slight variation, rather than having a separate attribute for each segment, in some cases, only a subset of segments may be handled in a special manner. Others of the segments may be determined to be safe. For example, simply restricting accesses differently depending on whether the memory access has an effective segment attribute of SS (e.g., stack segment) may be sufficient to support a deterministic return oriented programming (ROP) mitigation. For example, a stack-allocated object associated with an operand having an effective segment attribute of SS and deemed to be safe by a compiler of the processor 110 may be placed on a "safe" stack (e.g., a main stack), and other stack-allocated objects may be placed on an "unsafe" stack (e.g., another stack). That is, this initial pass may only place stack-allocated objects on the "safe" stack that the compiler of the processor 110 determines may be accessed safely (e.g., free of buffer overflows), and other stack-allocated objects may be placed on a separate "unsafe stack". The "safe" stack may be placed in a first segment of memory and the "unsafe" stack may be placed in a second segment of memory that is defined not to cover the "safe" stack in the first area of memory. By only setting the SOE bit on pages that are allocated to hold a safe stack and by setting the AD bit and not the SOE bit on at least one page immediately above that stack and on at least one page immediately below that stack, unallocated guard pages that may be placed above and below that stack to support dynamic stack growth may be unnecessary.

To support restricting memory accesses based on effective segments in a 64-bit mode, different domains (e.g., protection keys 128) may be assigned to pages of the memory 104 used for the "safe" stack than domains assigned to pages of the memory 104 used for the "unsafe" stack. A stack operation enable (SOE) attribute may be added to a PKR. The PKRs for the "safe" stack pages may have the both the AD bit and the SOE set to only allow accesses with an effective segment of SS. Stack operations that land on a page for which the SOE bit in the associated PKR is cleared may generate a page fault. The compiler of the processor may determine that memory operands referencing the effective segment register SS are safe, which may mitigate ROP attacks, since they rely on corrupting return addresses on the "safe" stack.

The memory management unit 112 may include a logic circuit 122 to receive the PKRs from the user PKR register 118 or the supervisor PKR register 120, and receive the memory access permission generated based on the status bits stored in the page table entry 116. The logic circuit 122 may combine the set of PKRs received from the user PKR register 118 or the supervisor PKR register 120 with the memory access permission generated based on the status bits stored in the page table entry 116 to generate a memory access permission for accessing the memory frames referenced in the page table entry 116 and for providing the memory access information (e.g., commands and data) to the bus 108 if access is granted.

Figure 2:
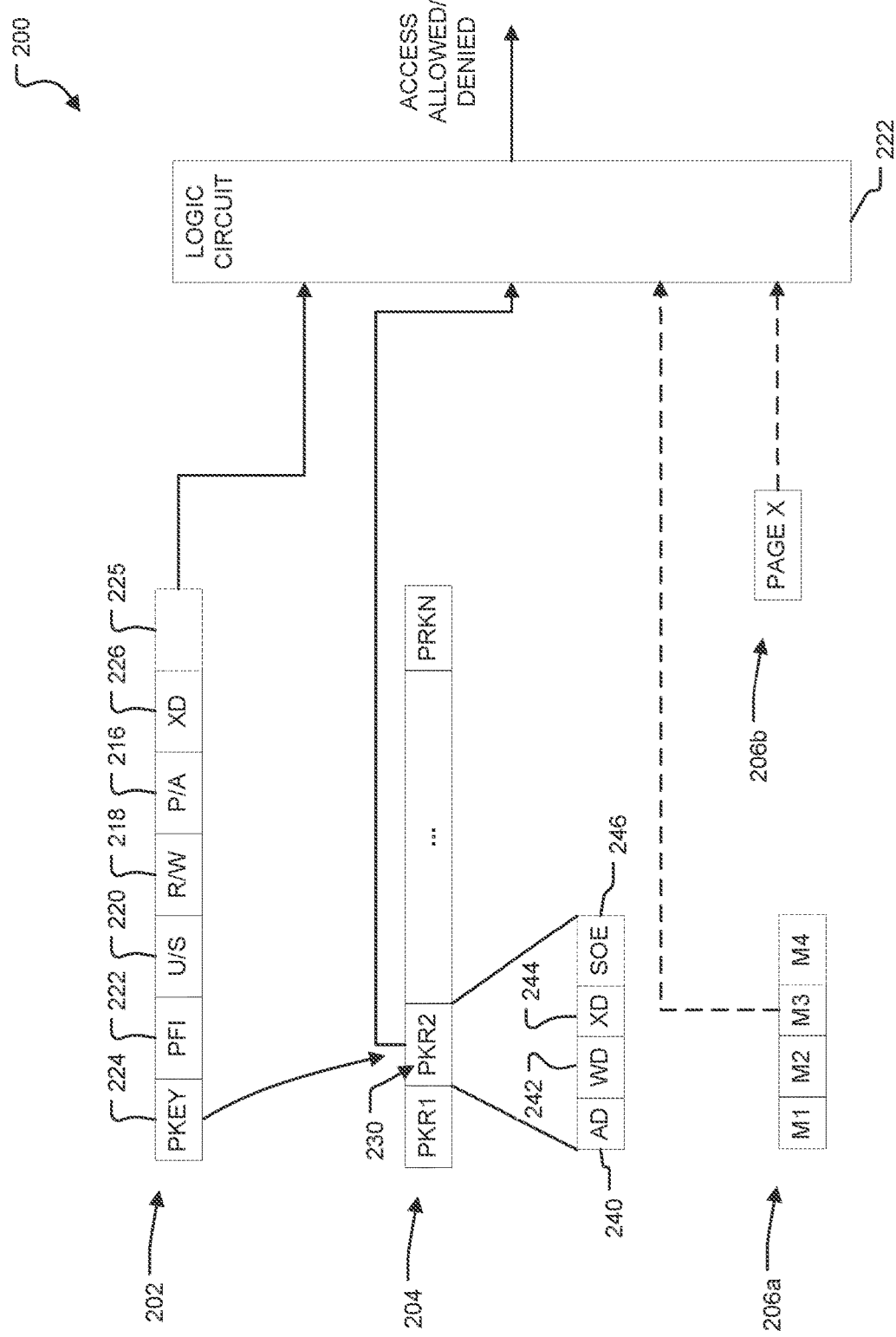
FIG. 2 illustrates a memory management unit to provide sandbox execution support according to an embodiment of the present disclosure.

FIG. 2 illustrates a memory management unit 200 to provide sandbox execution support according to an embodiment of the present disclosure. The memory management unit 200 may be implemented in the memory management unit 112 of FIG. 1. As shown in FIG. 2, the memory management unit 200 may include a translation lookaside buffer (TLB) entry 202 that includes a page table entry retrieved a page table, a PKR register entry 204 associated with specific memory frames, and either a PKR update mask 206a or a trusted PKR update page 206b. The TLB entry 202 may be one of multiple page table entries stored in a virtual address page table, such as the virtual address page table 114 of FIG. 1. The PKR register entry 204 may include a number of fields to store the memory access permissions associated with each PKR entry 230.

The TLB entry 202 may include one or more status bits, a protection key section 224, and a memory frame identifier section 222. The memory frame identifier section 222 (e.g., 32 bits in size) may store the memory frame numbers to which the page numbers of virtual addresses are mapped.

The one or more status bits may include a Present/Absent (P/A) 216 bit indicating whether the memory frame of the page table entry is in the memory. The one or more status bit may include a Read/Write (R/W) bit 218 indicating the memory access permission to the portion of the memory specified by the memory frames in the TLB entry 202. The one or more status bits may include a XD bit 226 indicating the execution permission to the instructions stored in the portion of memory.

In some examples, the one or more status bits may include a field 225, which may have two different meanings based on implementation. In a first example implementation, the field 225 may be a PKR update mask enable bit to indicate whether a PKR update mask is applied to PKR updates. In some examples, the PKR update mask enable may enable a PKR update mask 206a, which may be stored in a register. In some examples that include more than one PKR update mask, the field 225 may point to a specific bitmask in the register. In a second example implementation, the field 225 may indicate that PKR modifications are limited to a trusted PKR update page 206b as stored in a control register. In some examples, the control register may include more than one page.

In one embodiment, the TLB entry 202 may include a memory access mode bit or user/supervisor (U/S) status bit 220 indicating the privilege level of the task that is to access the memory frames referenced by the memory frame numbers of the TLB entry 202. In one embodiment, a "1" of the U/S status bit 220 may indicate that the task having a user-mode privilege or higher can access memory frames identified in the TLB entry 202, and a "0" of the U/S status bit 220 may indicate that only tasks having a supervisor-mode access may access the memory frames.

In one embodiment, the protection key section 224 may store an n-bit protection key (PKEY) that is tagged by the operating system to the TLB entry 202 for protecting memory frames of the TLB entry 202. In one embodiment, in response to mapping a memory frame in the task, the operating system may select a protection key (PKEY) from a number of protection keys available to the operating system and use the selected protection key to tag the TLB entry 202. In one embodiment, the operating system may provide an interface that applications can use to request the specific protection key of protection keys PKEY1 to PKEYN be used in a memory page. In one embodiment, the protection key is a string of n bits of binary code that may be used as an identifier to the PKR fields of the PKR register entry 204. In one embodiment, since the protection key 224 is n-bit in length, the PKR register entry 204 may include uniquely addressable $2^n$ fields.

In one embodiment, each PKR stored in the fields of the PKR register entry 204 may include a PKR entry 230. In one embodiment, the PKR entry 230 may include a first bit 240 to indicate whether all access is enabled or disabled (AD), a second bit 242 to indicate whether write access is enabled or disabled (WD), and a third bit to indicate whether execution access is enabled or disabled (XD). In some embodiments, the PKR entry 230 may include a fourth bit 246 to indicate whether a stack operation is enabled (SOE), which may override the settings of the AD and WD bits. In some embodiments, multiple bits may be defined to individually grant or deny different types of stack operations (e.g. read and/or write) instead of a single SOE bit. In some examples, the PKR entry 230 may also include bits indicating permissions for encrypting the memory frames stored in the TLB entry 202 and other defined attributes. The PKR register entry 204 may be implemented in either of the user PKR register 118 or the supervisor PKR register 120 of FIG. 1.

In one embodiment, the set of memory access permission bits stored in the PKR register entry 204 may be set by the operating system at the time to initiate the task or when switching to another task. In one embodiment, the PKR register entry 204 may be accessed by a user application having a user-mode access. Instructions to read or write the PKR register entry 204 may be provided to user applications. For example, the instructions include a user permission register read (RDPKRU) instruction that may allow a user application program to read the content of the PKR register entry 204, and a user permission register write (WRPKRU) instruction that may allow the user application program to write to the PKR register entry 204. By allowing the user application to directly manipulate the permissions stored in the PKR register entry 204, the performance overhead of changing the set of permissions through protection keys (e.g., by going through the operating system) may be reduced significantly, allowing for much broader use of the protection keys.

However, allowing any user application to update the PKRs of the PKR register may open the memory up to attacks by an untrusted application. As previously described, one method of vetting untrusted applications includes using a sandbox, which includes designating one or more pages for the untrusted application to use and restricting access to other memory pages. As previously described, one way to restrict access may include setting at least one of the AD bit 240, the WD bit 242, or the XD bit 244 of the PKR entry 230, which may be associated with a page not authorized as part of the sandbox. The AD bit 240, the WD bit 242, or the XD bit 244 of the PKR associated with the sandbox pages may remain cleared to allow the untrusted application to execute properly within those pages. However, as previously described, the untrusted application could modify the PKRs for the non-authorized/protected pages of the memory 104, and then access the non-authorized/protected pages.

In one embodiment to protect against modification of PKRs, the memory management unit 220 may include the PKR update mask 206a. The PKR update mask 206a may be implemented in the first register 140 or the second register 142 of FIG. 1. In one example, the PKR update mask 206a may include bits that align with bits of the PKRs in the PKR register entry 204. In this example, the PKR update mask 206a may include PKR update mask bits M1 to M3, and may optionally include PKR update mask bit M4 when the PKR includes the SOE bit 246. The PKR update mask bits M1-M4 included in the PKR update mask 206a may limit or preclude update of certain individual bits of the PKRs included in the PKR register entry 204. The PKR update mask 206a may require higher-level access permissions to in order to be modified, preventing an untrusted application from modifying the PKR update mask 206a.

In an additional embodiment update PKRs when entering and exiting sandbox execution, the PTE 202 may include a field 225 that indicates when the PKR update mask 206a should be applied (e.g., when the field 225 is set). In some examples, the field 225 may be set (e.g., enabling application of the PKR update mask 206a) prior to beginning execution of an untrusted application, in the sandbox and may be cleared (e.g., disabling application of the PKR update masks) upon completion of execution of the untrusted application.

Figure 4:
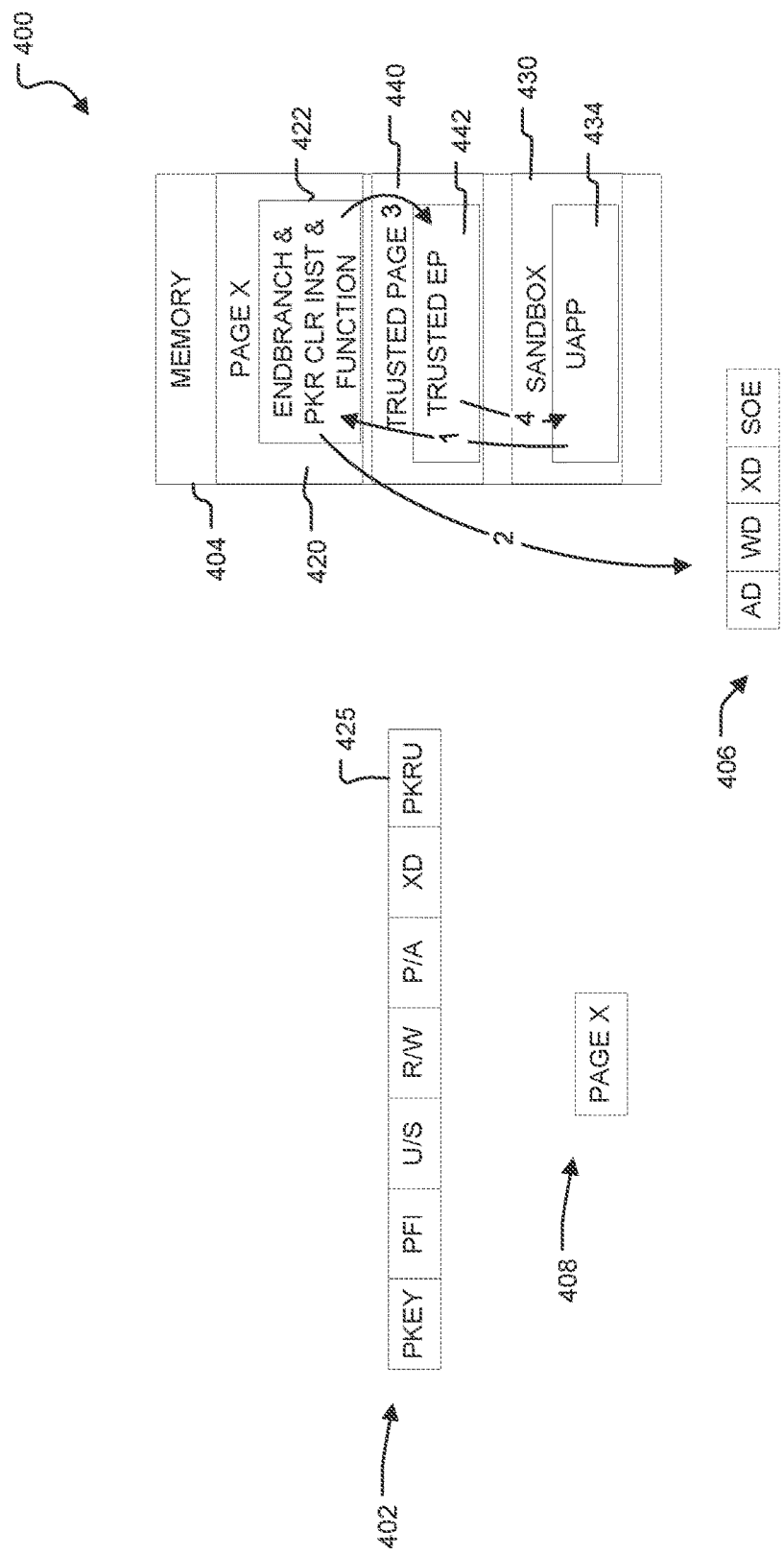
FIG. 4 illustrates an example branch flow for the trusted PKR update page enablement in accordance with some embodiments of the disclosure.

In another example to improve efficiency of in updating PKRs when entering and exiting sandbox execution, the previously mentioned field 225 may be set to indicate that PKR modifications are only allowed based on instruction calls from the trusted PKR update page 206b. In some examples, additional pages may be designated in a control register as being permitted to provide instructions to modify the PKRs of the PKR register entry 204. In this example, the field 225 may indicate that PKR updates are only permitted from the trusted PKR update page 206b. The trusted PKR update page 206b may include instructions to update the PKRs, and then a branch back to a trusted code entry point outside the sandbox without allowing the branch to be influenced by any register or memory location that is controlled by the untrusted code of the sandbox. That is, branches to this page or these pages from the sandbox would be denied, and branches from this page to the sandbox would be denied. The trusted PKR update page 206b may be made more robust by also requiring that all branches (e.g., direct and indirect) end/land on an ENDBRANCH (e.g., or similar) instruction. FIG. 4 illustrates an example branch flow 400 for the trusted PKR update page enablement in accordance with some embodiments of the disclosure. In the example depicted in FIG. 4, the memory 404 includes a PAGE X 420, a trusted page 440, and a sandbox page 430. The TLB entry 402 may include the trusted PKR update page field 425 that points to the trusted PKR update page 408, which identifies PAGE X. The PAGE X 420 includes ENDBRANCH & PKR clear instructions 422. The trusted page 440 may include a trusted entry point 442 to branch from the page X 420. The sandbox page 430 may include an untrusted application 434. In a first step, untrusted application 434 may branch to the ENDBRANCH PKR clear instructions 422. In a second step, the PKR clear instruction 422 may clear the bits of the PKR 406. In a third step, the ENDBRANCH & PKR clear instructions 422 may branch to the trusted entry point 442. An intended function may be performed, and the PKR bits 406 may be reset. In a fourth step, the trusted PKR entry point 442 may branch back to the untrusted application 434.

The memory management unit 200 may include a logic circuit 222 to receive pe missions from the TLB entry 202, the PKR from the PKR register, and optionally one of the PKR update mask 206a or the trusted PKR update page 206b, and may allow or deny access based on the received information.

Figure 5:
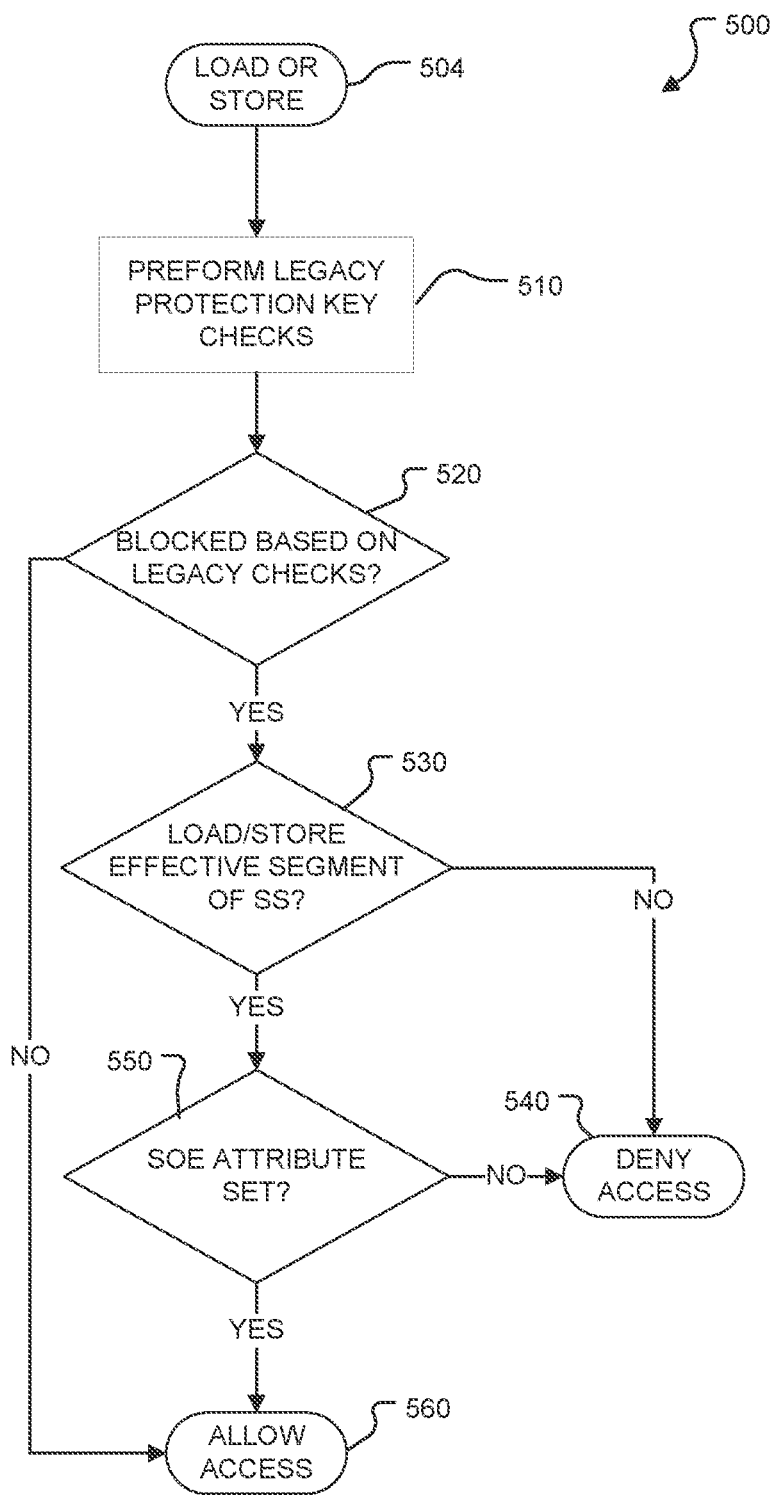
FIG. 5 illustrates a flow diagram of a method to provide sandbox execution support for protection key rights attacks in accordance with some embodiments of the disclosure.

FIG. 5 is a flow diagram of a method 500 attendant to a stack operation to determine whether to allow or deny access for an effective operand segment. The method 500 may be implemented in the computer system 100 of FIG. 1. As previously described with reference to FIG. 1, the stack operation may be as part of micro-sandbox of memory such that memory operands are evaluated based on effective segments and separated into different stacks based on effective segment registers.

The method 500 may include receiving a load or store operation, at 504. The method 500 may further include determining whether the load or store operation has been blocked by a legacy check (e.g., a page table entry permission check). In legacy checks, the effective segments may be associated with base and limit register entries to define a range of memory address that a particular operand is allowed to access. If an address associated with the operand falls outside the range of addresses, the access may be blocked. In 64-bit mode, these limit checks on the address range may not be implemented. If the access has not been blocked, the method 500 may include allowing the access, at 560. If the access has been blocked based on the legacy checks, the method 500 may include determining whether the load or store operand has an effective segment of the access may be a stack segment (SS), at 530. If the effective segment is not a SS, then the access is denied, at 540.

If the effective segment is a SS, the method 500 may further include determining whether a stack op enable (SOE) attribute is set, at 550. The SOE may be an attribute stored in an associated PKR, such as a PKR of the user PKR register 118 or the supervisor PKR register 120 of FIG. 1, a PKR of the PKR register entry 204 of FIG. 2, or combinations thereof. If the SOE attribute is set, the method 500 may include allowing the access, at 560. Otherwise, the method 500 may include denying the access, at 540. Thus, when a compiler of the processor 110 determines that memory operands referencing the effective segment register SS are safe and the AD and/or WD attributes and SOE attribute are set for PKR(s) for safe stack pages, ROP attacks may be mitigated since they rely on corrupting return addresses on a safe stack.

Figure 6:
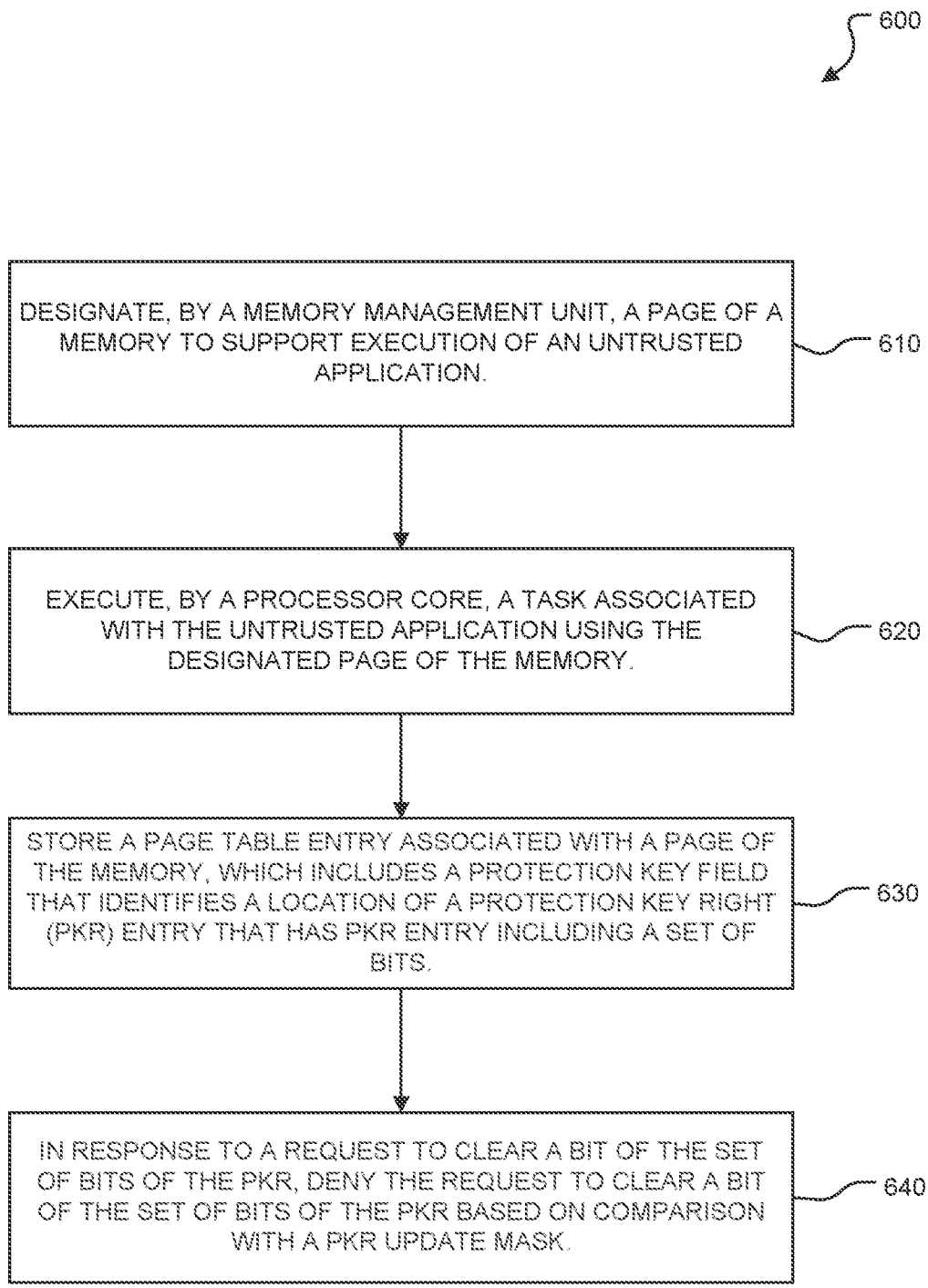
FIG. 6 illustrates a flow diagram of a method to provide sandbox execution support for protection key rights attacks in accordance with some embodiments of the disclosure.

FIG. 6 illustrates a flow diagram of a method 600 to provide sandbox execution support for protection key rights attacks in accordance with some embodiments of the disclosure. The method 600 may be implemented in the processor system 100 of FIG. 1, the memory management unit 200 of FIG. 2, or combinations thereof.

The method 600 may include designating, by a memory management unit, a page of a memory to support execution of an untrusted application, at 610. The memory management unit may include the memory management unit 112 of FIG. 1, the memory management unit 200 of FIG. 2, or combinations thereof. The memory may include the memory 104 of FIG. 1.

The method 600 may include executing, by a processor core, a task associated with the untrusted application using the designated page of the memory, at 620. The processor core may include the processor core 110 of the processor 102 of FIG. In some examples, the processor core may operate in a 64-bit mode to execute the untrusted application.

The method 600 may include storing a page table entry associated with a page of the memory, at 630. The page table entry includes a protection key field that identifies a location of a protection key right (PKR) entry and a field that enables a trusted PKR update page of the memory. The PKR entry including a set of bits. The page table entry may include the page table entry 116 of FIG. 1, the TLB entry 202 of FIG. 2, the page table entry 402 of FIG. 4, or combinations thereof. The PKR entry may include the PKR entry 230 of FIG. 2. The method 600 may further include retrieving the PKR entry from a PKR register. The PKR register may include any of the user PKR register 118 or the supervisor PKR register 120 of FIG. 1, the PKR register entry 204 of FIG. 2, or combinations thereof. In some examples, the method 600 may include, prior to a start of execution of the untrusted application, executing trusted code included in the designated page of the memory to support execution of the untrusted application. The trusted code may include a branch to an instruction of a trusted page of the memory to clear bits of a PKR entry associated with the designated page of the memory to support execution of the untrusted application. The method 600 may further include allowing the bits of the PKR entry to be cleared based on a set of bits in the PKR entry associated with the trusted page of the memory.

The method 600 may include, in response to a request to clear a bit of the set of bits of the PKR, generate a page fault in response to the request originating in a page other than the trusted PKR update page of the memory, at 640. In some examples, the request to clear the bit of the set of bits of the PKR entry may include a request to clear one of an access disable bit, a write disable bit, or an execution disable bit. In some examples, the method 600 may further include allowing the request to clear the execute disable bit responsive to a PKR update mask enable field of the page table entry being cleared. In some examples, the method 600 may further include retrieving the PKR update mask from a register responsive to the PKR update mask enable field being set.

In some examples, the method 600 may further include storing a second page table entry associated with the designated page of the memory to support execution of the untrusted application, which may include the protection key field that identifies a location of a second PKR entry that may include a second set of bits, and in response to a second request to clear a bit of the second set of bits of the second PKR, allowing the request to clear the bit of the second set of bits of the second PKR based on comparison with a second PKR update mask.

Figure 7:
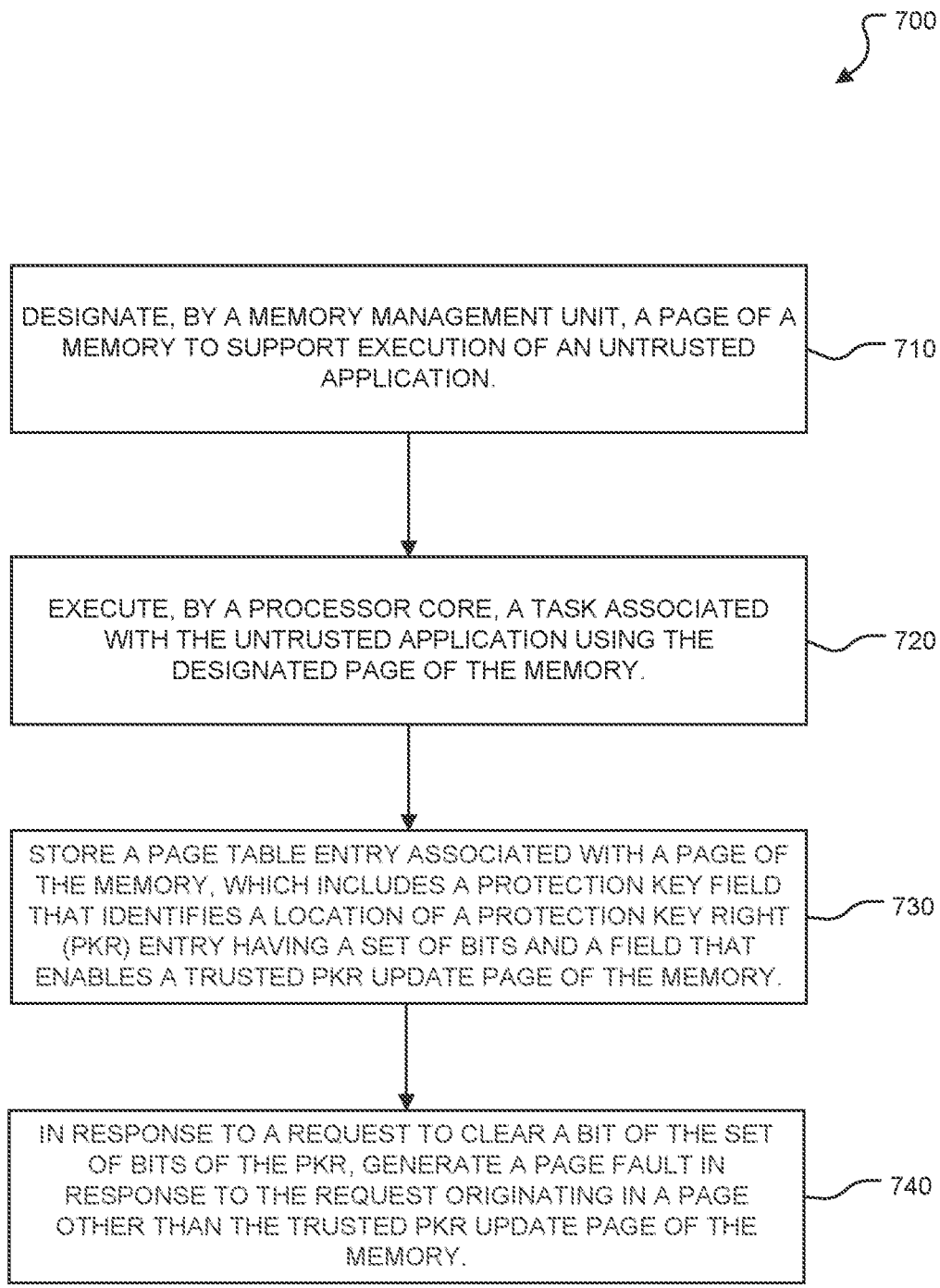
FIG. 7 illustrates a flow diagram of a method to provide sandbox execution support for protection key rights attacks in accordance with some embodiments of the disclosure.

FIG. 7 illustrates a flow diagram of a method 700 to provide sandbox execution support for protection key rights attacks in accordance with some embodiments of the disclosure. The method 700 may be implemented in the processor system 100 of FIG. 1, the memory management unit 200 of FIG. 2, or combinations thereof.

The method 700 may include designating, by a memory management unit, a page of a memory to support execution of an untrusted application, at 710. The memory management unit may include the memory management unit 112 of FIG. 1, the memory management unit 200 of FIG. 2, or combinations thereof. The memory may include the memory 104 of FIG. 1.

The method 700 may include executing, by a processor core, a task associated with the untrusted application using the designated page of the memory, at 720. The processor core may include the processor core 110 of the processor 102 of FIG. In some examples, the processor core may operate in a 64-bit mode to execute the untrusted application.

The method 700 may include storing a page table entry associated with a page of the memory, at 730. The page table entry including a protection key field that identifies a location of a protection key right (PKR) entry and a field that enables a trusted PKR update page of the memory. The PKR entry including a set of bits. The page table entry may include the page table entry 116 of FIG. 1, the TLB entry 202 of FIG. 2, the page table entry 402 of FIG. 4, or combinations thereof. The PKR entry may include the PKR entry 230 of FIG. 2. The method 700 may further include, in response to the field that enables the trusted PKR update page enable being set, retrieving, from a register, an identifier of the trusted PKR update page. The register may include a control register. The method 700 may further include allowing access to the trusted PKR update page via a branch from the page of the memory to support execution of the untrusted application in response to the branch being an END-BRANCH instruction. The method 700 may further include denying access to the trusted PKR update page via a branch from the page of the memory to support execution of the untrusted application in response to the branch landing on an instruction other than an ENDBRANCH instruction.

The method 700 may include, in response to a request to clear a bit of the set of bits of the PKR, generate a page fault in response to the request originating in a page other than the trusted PKR update page of the memory, at 740. In some examples, the request to clear the bit of the set of bits of the PKR entry may include a request to clear one of an access disable bit, a write disable bit, or an execution disable bit.

Figure 8:
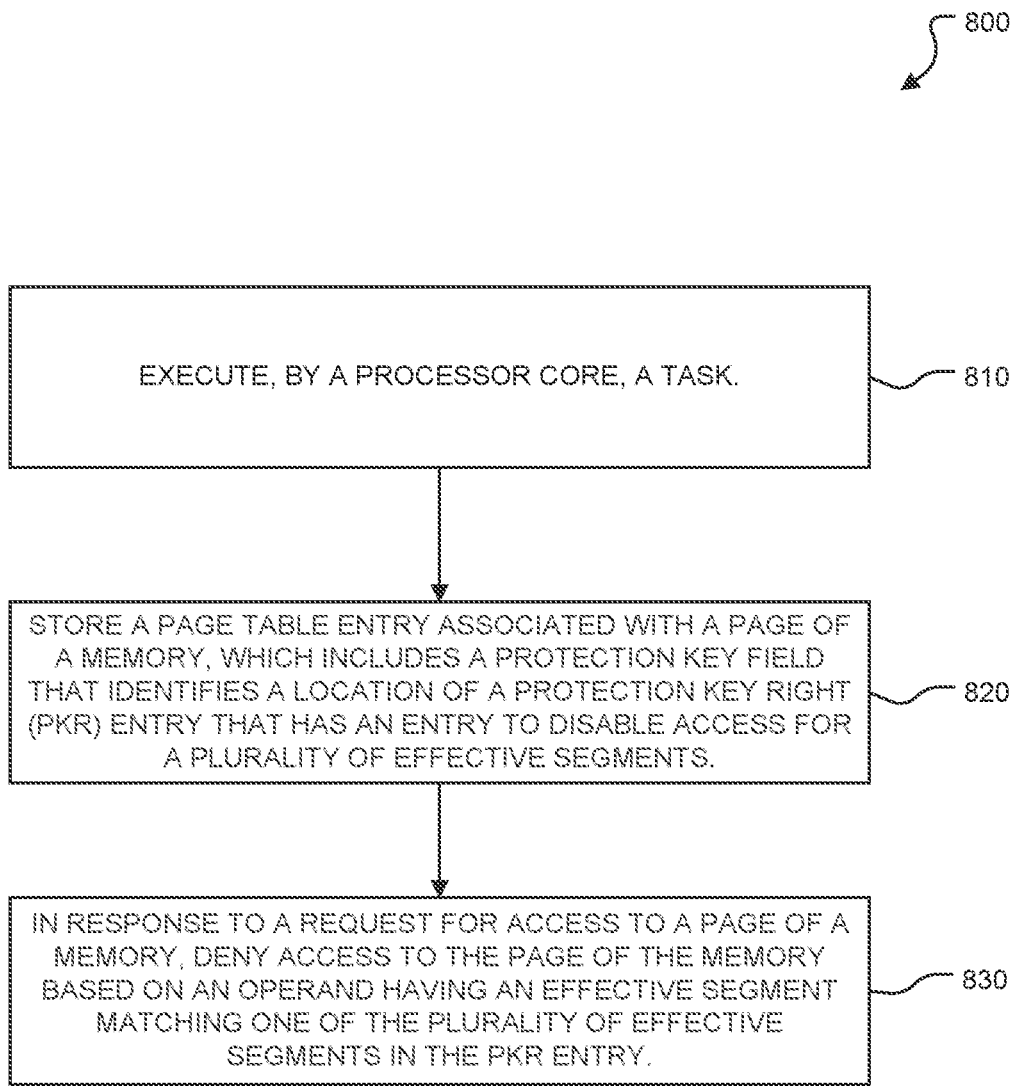
FIG. 8 illustrates a flow diagram of a method to provide sandbox execution support for protection key rights attacks in accordance with some embodiments of the disclosure.

FIG. 8 illustrates a flow diagram of a method 800 to provide sandbox execution support for protection key rights attacks in accordance with some embodiments of the disclosure. The method 800 may be implemented in the processor system 100 of FIG. 1, the memory management unit 200 of FIG. 2, or combinations thereof.

The method 800 may include executing, by a processor core, a task, at 810. The processor core may include the processor core 110 of the processor 102 of FIG. In some examples, the processor core may operate in a 64-bit mode to execute the entrusted application.

The method 800 may include storing a page table entry associated with a page of a memory, at 820. The page table entry including a protection key field that identifies a location of a protection key right (PKR) entry. The PKR entry including an entry to disable access for a plurality of effective segments. The storing of the page table may be performed by a memory management unit, such as the memory management unit 112 of FIG. 1, the memory management unit 200 of FIG. 2, or combinations thereof. The page table entry may include the 116 of FIG. 1, the TLB entry 202 of FIG. 2, the page table entry 402 of FIG. 4, or combinations thereof. The PKR entry may include the PKR entry 230 of FIG. 2.

The method 800 may include, in response to a request for access to a page of a memory, denying access to the page of the memory based on an operand having an effective segment attribute matching one of the plurality of effective segments, at 830. In some examples, the request to clear the bit of the set of bits of the PKR entry may include a request to clear one of an access disable bit, a write disable bit, or an execution disable bit.

In some examples, the method 800 may further include receiving a plurality of operands, categorizing operands of the plurality of operands having effective segments equal a first type into a first stack and operands of the plurality of operands having effective segments other than the first type onto a second stack. In some examples, the first stack may be a main stack and the second stack may be an unsafe stack. In some examples, the first type of the effective stack segment is a stack segment (SS). The method 800 may further include allowing access to a page of a memory for operands with the effective segment attribute corresponding to the first stack, and denying access to a page of the memory for operands with any other effective segment attribute. That is, operands having the SS effective segment attribute may be allowed to access a page of the memory, and operands having one of any other effective segment attribute may be blocked from accessing the page of the memory.

In some examples, the PKR entry of the PKR register may further include a stack operation enable (SOE) bit. The method 800 may further include denying access to a page of a memory for operands on the first stack while the SOE bit is set. The method 800 may further include, to support 64-bit mode, setting the SOE bit of the PKR entry, setting an access disable bit of the PKR entry, and only allowing access to a page of a memory for operands that have an effective segment equal to a first type while the SOE bit is set.

Figure 9:
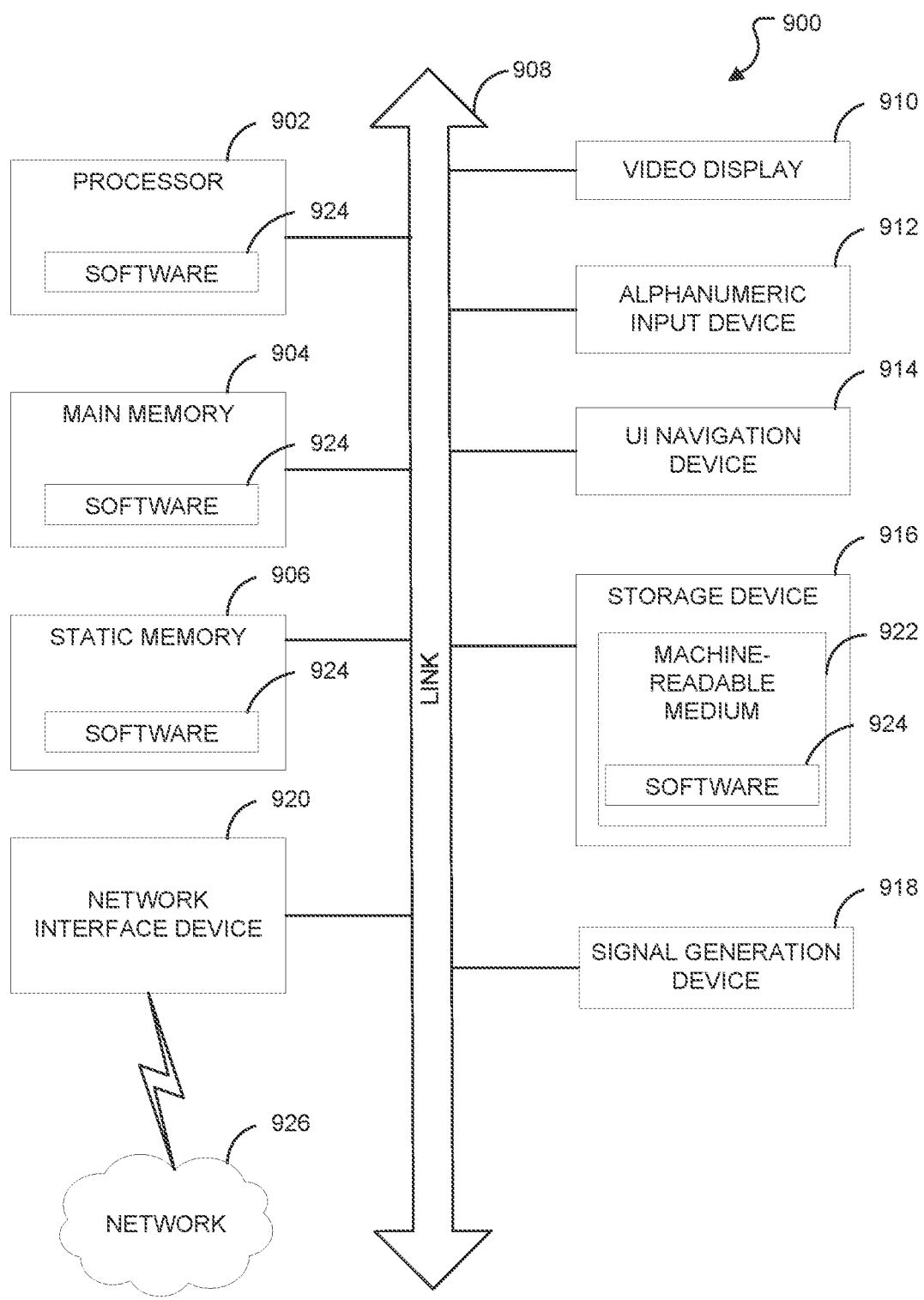
FIG. 9 illustrates a block diagram illustrating a machine in the example form of a computer system in accordance with some embodiments of the disclosure.

FIG. 9 is a block diagram illustrating a machine in the example form of a computer system 900, within which a set or sequence of instructions may be executed to cause the machine to perform any one or more of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a hybrid tablet, a server, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 900 includes at least one processor unit 902 (e.g., a central processing unit (CPU), a graphics processing unit (GPU) or both, processor cores, compute nodes, etc.), a main memory 904 and a static memory 906, which communicate with each other via a link 908 (e.g., bus). The computer system 900 may further include a video display unit 910, an alphanumeric input device 912 (e.g., a keyboard), and a user interface (UI) navigation device 914 (e.g., a mouse). In one embodiment, the video display unit 910, input device 912 and UI navigation device 914 are incorporated into a touch screen display. The computer system 900 may additionally include a storage device 916 (e.g., a drive unit), a signal generation device 918 (e.g., a speaker), a network interface device 920, and one or more sensors (not shown), such as a global positioning system (GPS) sensor, compass, accelerometer, gyrometer, magnetometer, or other sensor.

The storage device 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor unit 902 during execution thereof by the computer system 900, with the main memory 904, static memory 906, and the processor unit 902 also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the one or more instructions 924. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Various illustrative components, blocks, configurations, modules, and steps have been described above generally in terms of their functionality. Skilled artisans may implement the described functionality in varying ways for each particular application, but such implementation decisions should not be interpreted as causing a departure from the scope of the present disclosure.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as previously described.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the software may reside on at least one machine-readable medium.

The term "module" is understood to encompass a tangible entity, be that an entity that is physically constructed, specifically configured (e.g., hardwired), or temporarily (e.g., transitorily) configured (e.g., programmed) to operate in a specified manner or to perform at least part of any operation described herein. Considering examples in which modules are temporarily configured, a module need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. The terms "application, process, or service," or variants thereof, is used expansively herein to include routines, program modules, programs, components, and the like, and may be implemented on various system configurations, including single-processor or multiprocessor systems, microprocessor-based electronics, single-core or multi-core systems, combinations thereof, and the like. Thus, the terms "application, process, or service" may be used to refer to an embodiment of software or to hardware arranged to perform at least part of any operation described herein.

While a machine-readable medium may include a single medium, the term "machine-readable medium" may include a single medium or multiple media (e.g., a centralized or distributed database, and/or associated caches and servers).

ADDITIONAL NOTES & EXAMPLES

Example 1 is a processor system to provide sandbox execution support for protection key rights attacks, the computer device comprising: a processor core to execute a task associated with an untrusted application, the processor core to execute the task using a designated page of a memory; and a memory management unit, coupled to the processor core, the memory management unit to designate the page of the memory to support execution of the untrusted application, the memory management unit comprising: a storage unit to store a page table entry associated with a page of the memory, the page table entry including a protection key field that identifies a location of a protection key right (PKR) entry; and a PKR register including the PKR entry, the PKR entry including a set of bits; and wherein the memory management unit to, in response to a request to clear a bit of the set of bits of the PKR, deny the request to clear a bit of the set of bits of the PKR based on comparison with a PKR update mask.

In Example 2, the subject matter of Example 1 optionally includes wherein the page table entry further includes a PKR update mask enable field, wherein the memory management unit to allow the request to clear the execute disable bit responsive to the PKR update mask enable field being cleared.

In Example 3, the subject matter of Example 2 optionally includes wherein the memory management unit to retrieve the PKR update mask from a register responsive to the PKR update mask enable field being set.

In Example 4, the subject matter of Example 3 optionally includes wherein the memory management unit includes the register storing the PKR update mask.

In Example 5, the subject matter of any one or more of Examples 3-4 optionally include wherein: the storage unit further to store a second page table entry associated with the designated page of the memory to support execution of the untrusted application, the second page table entry including the protection key field that identifies a location of a second PKR entry; and the PKR register including the second PKR entry, the second PKR entry including a second set of bits; and wherein the memory management unit to, in response to a second request to clear a bit of the second set of bits of the second PKR, allow the request to clear the bit of the second set of bits of the second PKR based on comparison with a second PKR update mask.

In Example 6, the subject matter of any one or more of Examples 1-5 optionally include wherein the PKR register is associated with user PKRs.

In Example 7, the subject matter of any one or more of Examples 1-6 optionally include wherein the processor core to operate in a 64-bit mode to execute the untrusted application.

In Example 8, the subject matter of any one or more of Examples 1-7 optionally include wherein, prior to a start of execution of the untrusted application, the processor core to execute trusted code included in the designated page of the memory to support execution of the untrusted application, wherein the trusted code includes a branch to an instruction of a trusted page of the memory to clear bits of a PKR entry associated with the designated page of the memory to support execution of the untrusted application, wherein the memory management unit to allow the bits of the PKR entry to be cleared based on a set of bits in a PKR entry associated with the trusted page of the memory.

In Example 9, the subject matter of any one or more of Examples 1-8 optionally include wherein the request to clear the bit of the set of bits of the PKR entry includes a request to clear one of an access disable bit, a write disable bit, or an execution disable bit.

Example 10 is a processor system to provide sandbox execution support for protection key rights attacks, the computer device comprising: a processor core to execute a task associated with an untrusted application, the processor core to execute the task using a designated page of a memory; and a memory management unit, coupled to the processor core, the memory management unit to designate the page of the memory to support execution of the untrusted application, the memory management unit comprising: a storage unit to store a page table entry associated with a page of the memory, the page table entry including a protection key field that identifies a location of a protection key right (PKR) entry and a field that enables a trusted PKR update page of the memory; and a PKR register including the PKR entry, the PKR entry including a set of bits; and wherein the memory management unit to, in response to a request to clear a bit of the set of bits of the PKR, generate a page fault in response to the request originating in a page other than the trusted PKR update page of the memory.

In Example 11, the subject matter of Example 10 optionally includes wherein the memory management unit to, in response to the field that enables the trusted PKR update page enable being set, retrieve, from a register, an identifier of the trusted PKR update page.

In Example 12, the subject matter of Example 11 optionally includes wherein the register is a control register.

In Example 13, the subject matter of any one or more of Examples 10-12 optionally include wherein the memory management unit to allow access to the trusted PKR update page via a branch from the page of the memory to support execution of the untrusted application in response to the branch being an ENDBRANCH instruction.

In Example 14, the subject matter of any one or more of Examples 10-13 optionally include wherein the processor core to deny access to the trusted PKR update page via a branch from the page of the memory to support execution of the untrusted application in response to the branch landing on an instruction other than an ENDBRANCH instruction.

In Example 15, the subject matter of any one or more of Examples 10-14 optionally include wherein the processor core to operate in a 64-bit mode to execute the untrusted application.

In Example 16, the subject matter of any one or more of Examples 10-15 optionally include wherein the request to clear the bit of the set of bits of the PKR entry includes a request to clear one of an access disable bit, a write disable bit, or an execution disable bit.

Example 17 is a processor system to provide sandbox execution support for protection key rights attacks, the computer device comprising: a processor core to execute a task; and a memory management unit, coupled to the processor core, the memory management unit comprising: a storage unit to store a page table entry associated with a page of a memory, the page table entry including a protection key field that identifies a location of a protection key right (PKR) entry; and a PKR register including the PKR entry, the PKR entry including an entry to disable access for a plurality of effective segments; and wherein the memory management unit to, in response to a request for access to a page of a memory, deny access to the page of the memory based on an operand having an effective segment that matches one of the plurality of effective segments in the PKR entry.

In Example 18, the subject matter of Example 17 optionally includes wherein the processor core to categorize operands having effective segments different than all of the plurality of effective segments in the PKR entry into a first stack and to categorize operands having effective segments that match one of the plurality of effective segments in the PKR entry, wherein the memory management unit to allow access to a page of a memory for operands in the first stack and deny access to a page of the memory for operands in the second stack.

In Example 19, the subject matter of Example 18 optionally includes wherein the PKR entry of the PKR register further includes a stack operation enable (SOE) bit, wherein the memory management unit to allow access to a page of a memory for operands on the first stack while the SOE bit is set.

In Example 20, the subject matter of any one or more of Examples 18-19 optionally include wherein the PKR entry of the PKR register further includes a stack operation enable (SOE) bit, wherein the memory management unit to deny access to a page of a memory for operands on the first stack while the SOE bit is cleared.

In Example 21, the subject matter of any one or more of Examples 18-20 optionally include wherein the PKR entry of the PKR register includes the SOE bit being set and an access disable bit set, wherein the memory management unit to only allow access to a page of a memory for operands that have an effective segment equal to a first type while the SOE bit is set.

In Example 22, the subject matter of any one or more of Examples 18-21 optionally include wherein the first stack is a safe stack and the second stack is an unsafe stack.

In Example 23, the subject matter of any one or more of Examples 18-22 optionally include wherein the first type of the effective segment is a stack segment (SS).

Example 24 is a method to provide sandbox execution support for protection key rights attacks, the method comprising: designating, by a memory management unit, a page of a memory to support execution of an untrusted application; executing, by a processor core, a task associated with the untrusted application using the designated page of the memory; storing a page table entry associated with a page of the memory, the page table entry including a protection key field that identifies a location of a protection key rights (PKR) entry, the PKR entry including a set of bits; and in response to a request to clear a bit of the set of bits of the PKR, denying the request to clear a bit of the set of bits of the PKR based on comparison with a PKR update mask.

In Example 25, the subject matter of Example 24 optionally includes allowing the request to clear the execute disable bit responsive to a PKR update mask enable field of the page table entry being cleared.

In Example 26, the subject matter of Example 25 optionally includes retrieving the PKR update mask from a register responsive to the PKR update mask enable field being set.

In Example 27, the subject matter of Example 26 optionally includes storing a second page table entry associated with the designated page of the memory to support execution of the untrusted application, the second page table entry including the protection key field that identifies a location of a second PKR entry, the second PKR entry including a second set of bits; and in response to a second request to clear a bit of the second set of bits of the second PKR, allowing the request to clear the bit of the second set of bits of the second PKR based on comparison with a second PKR update mask.

In Example 28, the subject matter of any one or more of Examples 24-27 optionally include retrieving the PKR entry from a PKR register.

In Example 29, the subject matter of any one or more of Examples 24-28 optionally include wherein the processor core to operate in a 64-bit mode to execute the untrusted application.

In Example 30, the subject matter of any one or more of Examples 24-29 optionally include wherein, prior to a start of execution of the untrusted application: executing trusted code included in the designated page of the memory to support execution of the untrusted application, wherein the trusted code includes a branch to an instruction of a trusted page of the memory to clear bits of a PKR entry associated with the designated page of the memory to support execution of the untrusted application; and allowing the bits of the PKR entry to be cleared based on the set of bits in the PKR entry associated with the trusted page of the memory.

In Example 31, the subject matter of any one or more of Examples 24-30 optionally include wherein the request to clear the bit of the set of bits of the PKR entry includes a request to clear one of an access disable bit, a write disable bit, or an execution disable bit.

Example 32 is at least one medium including instructions that, when executed on a machine cause the machine to perform any of the methods of Examples 24-31.

Example 33 is an apparatus comprising means for performing any of the methods of Examples 24-31.

Example 34 is a method to provide sandbox execution support for protection key rights attacks, the method comprising: designating, by a memory management unit, a page of a memory to support execution of an untrusted application; executing, by a processor core, a task associated with the untrusted application using the designated page of the memory; storing a page table entry associated with a page of the memory, the page table entry including a protection key field that identifies a location of a protection key right (PKR) entry and a field that enables a trusted PKR update page of the memory, the PKR entry including a set of bits; and in response to a request to clear a bit of the set of bits of the PKR, generating a page fault in response to the request originating in a page other than the trusted PKR update page of the memory.

In Example 35, the subject matter of Example 34 optionally includes in response to the field that enables the trusted PKR update page enable being set, retrieving, from a register, an identifier of the trusted PKR update page.

In Example 36, the subject matter of Example 35 optionally includes wherein the register is a control register.

In Example 37, the subject matter of any one or more of Examples 34-36 optionally include allowing access to the trusted PKR update page via a branch from the page of the memory to support execution of the untrusted application in response to a target of the branch target being an END-BRANCH instruction.

In Example 38, the subject matter of any one or more of Examples 34-37 optionally include denying access to the trusted PKR update page via a branch from the page of the memory to support execution of the untrusted application in response to the branch landing on an instruction other than an ENDBRANCH instruction.

In Example 39, the subject matter of any one or more of Examples 34-38 optionally include wherein the processor core to operate in a 64-bit mode to execute the untrusted application.

In Example 40, the subject matter of any one or more of Examples 34-39 optionally include wherein the request to clear the bit of the set of bits of the PKR entry includes a request to clear one of an access disable bit, a write disable bit, or an execution disable bit.

Example 41 is at least one medium including instructions that, when executed on a machine cause the machine to perform any of the methods of Examples 34-40.

Example 42 is an apparatus comprising means for performing any of the methods of Examples 34-41.

Example 43 is a method to provide sandbox execution support for protection key rights attacks, the method comprising: executing, by a processor core, a task; storing a page table entry associated with a page of a memory, the page table entry including a protection key field that identifies a location of a protection key rights (PKR) entry, the PKR entry including an entry to disable access for a plurality of effective segments; and in response to a request for access to a page of a memory, denying access to the page of the memory based on an operand having an effective segment attribute matching one of the plurality of effective segments in the PKR entry.

In Example 44, the subject matter of Example 43 optionally includes categorizing operands having effective segments different from all of the plurality of effective segments in the PKR entry into a first stack; categorizing operands having effective segments that match one of the plurality of effective segments in the PKR entry into a second stack; allowing access to a page of a memory for operands in the first stack; and denying access to a page of the memory for operands in the second stack.

In Example 45, the subject matter of Example 44 optionally includes wherein the PKR entry of the PKR register further includes a stack operation enable (SOE) bit, the method further comprising denying access to a page of a memory for operands on the first stack while the SOE bit is set.

In Example 46, the subject matter of any one or more of Examples 44-45 optionally include setting the SOE bit of the PKR entry; setting an access disable bit of the PKR entry; and only allowing access to a page of a memory for operands that have an effective segment equal to a first type while the SOE bit is set.

In Example 47, the subject matter of any one or more of Examples 44-46 optionally include wherein the first stack is a main stack and the second stack is an unsafe stack.

In Example 48, the subject matter of any one or more of Examples 44-47 optionally include wherein the first type of the effective stack segment is a segment stack (SS).

Example 49 is at least one medium including instructions that, when executed on a machine cause the machine to perform any of the methods of Examples 43-48.

Example 50 is an apparatus comprising means for performing any of the methods of Examples 43-48.

Example 51 is an apparatus, the apparatus comprising: means for designating, by a memory management unit, a page of a memory to support execution of an untrusted application; means for executing, by a processor core, a task associated with the untrusted application using the designated page of the memory; means for storing a page table entry associated with a page of the memory, the page table entry including a protection key field that identifies a location of a protection key rights (PKR) entry, the PKR entry including a set of bits; and means for, in response to a request to clear a bit of the set of bits of the PKR, denying the request to clear a bit of the set of bits of the PKR based on comparison with a PKR update mask.

In Example 52, the subject matter of Example 51 optionally includes means for allowing the request to clear the execute disable bit responsive to a PKR update mask enable field of the page table entry being cleared.

In Example 53, the subject matter of Example 52 optionally includes means for retrieving the PKR update mask from a register responsive to the PKR update mask enable field being set.

In Example 54, the subject matter of Example 53 optionally includes means for storing a second page table entry associated with the designated page of the memory to support execution of the untrusted application, the second page table entry including the protection key field that identifies a location of a second PKR entry, the second PKR entry including a second set of bits; and means for, in response to a second request to clear a bit of the second set of bits of the second PKR, allowing the request to clear the bit of the second set of bits of the second PKR based on comparison with a second PKR update mask.

In Example 55, the subject matter of any one or more of Examples 51-54 optionally include means for retrieving the PKR entry from a PKR register.

In Example 56, the subject matter of any one or more of Examples 51-55 optionally include wherein the processor core to operate in a 64-bit mode to execute the untrusted application.

In Example 57, the subject matter of any one or more of Examples 51-56 optionally include wherein, prior to a start of execution of the untrusted application: means for executing trusted code included in the designated page of the memory to support execution of the untrusted application, wherein the trusted code includes a branch to an instruction of a trusted page of the memory to clear bits of a PKR entry associated with the designated page of the memory to support execution of the untrusted application; and means for allowing the bits of the PKR entry to be cleared based on the set of bits in the PKR entry associated with the trusted page of the memory.

In Example 58, the subject matter of any one or more of Examples 51-57 optionally include wherein the request to clear the bit of the set of bits of the PKR entry includes a request to clear one of an access disable bit, a write disable bit, or an execution disable bit.

Example 59 is an apparatus to provide sandbox execution support for protection key rights attacks, the apparatus comprising: means for designating, by a memory management unit, a page of a memory to support execution of an untrusted application; means for executing, by a processor core, a task associated with the untrusted application using the designated page of the memory; means for storing a page table entry associated with a page of the memory, the page table entry including a protection key field that identifies a location of a protection key right (PKR) entry and a field that enables a trusted PKR update page of the memory, the PKR entry including a set of bits; and means for, in response to a request to clear a bit of the set of bits of the PKR, generating a page fault in response to the request originating in a page other than the trusted PKR update page of the memory.

In Example 60, the subject matter of Example 59 optionally includes means for, in response to the field that enables the trusted PKR update page enable being set, retrieving, from a register, an identifier of the trusted PKR update page.

In Example 61, the subject matter of Example 60 optionally includes wherein the register is a control register.

In Example 62, the subject matter of any one or more of Examples 59-61 optionally include means for allowing access to the trusted PKR update page via a branch from the page of the memory to support execution of the untrusted application in response to a target of the branch target being an ENDBRANCH instruction.

In Example 63, the subject matter of any one or more of Examples 59-62 optionally include means for denying access to the trusted PKR update page via a branch from the page of the memory to support execution of the untrusted application in response to the branch landing on an instruction other than an ENDBRANCH instruction.

In Example 64, the subject matter of any one or more of Examples 59-63 optionally include wherein the processor core operates in a 64-bit mode to execute the untrusted application.

In Example 65, the subject matter of any one or more of Examples 59-64 optionally include wherein the request to clear the bit of the set of bits of the PKR entry includes a request to clear one of an access disable bit, a write disable bit, or an execution disable bit.

Example 66 is an apparatus to provide sandbox execution support for protection key rights attacks, the apparatus comprising: means for executing, by a processor core, a task; means for storing a page table entry associated with a page of a memory, the page table entry including a protection key field that identifies a location of a protection key rights (PKR) entry, the PKR entry including an entry to disable access for a plurality of effective segments; and means for, in response to a request for access to a page of a memory, denying access to the page of the memory based on an operand having an effective segment attribute matching one of the plurality of effective segments in the PKR entry.

In Example 67, the subject matter of Example 66 optionally includes means for categorizing operands having effective segments different from all of the plurality of effective segments in the PKR entry into a first stack; means for categorizing operands having effective segments that match one of the plurality of effective segments in the PKR entry into a second stack; means for allowing access to a page of a memory for operands in the first stack; and means for denying access to a page of the memory for operands in the second stack.

In Example 68, the subject matter of Example 67 optionally includes wherein the PKR entry of the PKR register further includes a stack operation enable (SOE) bit, the apparatus further comprising means for denying access to a page of a memory for operands on the first stack while the SOE bit is set.

In Example 69, the subject matter of any one or more of Examples 67-68 optionally include means for setting the SOE bit of the PKR entry; means for setting an access disable bit of the PKR entry; and means for only allowing access to a page of a memory for operands that have an effective segment equal to a first type while the SOE bit is set.

In Example 70, the subject matter of any one or more of Examples 67-69 optionally include wherein the first stack is a main stack and the second stack is an unsafe stack.

In Example 71, the subject matter of any one or more of Examples 67-70 optionally include wherein the first type of the effective stack segment is a segment stack (SS).

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third,"

etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. However, the claims may not set forth features disclosed herein because embodiments may include a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A processor system to provide sandbox execution support for protection key rights attacks, the processor system comprising:
    a processor core to execute a task associated with an untrusted application, the processor core to execute the task using a designated page of a memory; and
    a memory management unit, coupled to the processor core, the memory management unit to designate the page of the memory to support execution of the untrusted application, the memory management unit comprising:
        a storage unit to store a page table entry associated with a page of the memory, the page table entry including a protection key field that identifies a location of a protection key right (PKR) entry and a field that enables a trusted PKR update page of the memory; and
        a PKR register including the PKR entry, the PKR entry including a set of bits; and
    the memory management unit to:
        receive a request to clear a bit of the set of bits of the PKR entry; and
        in response to the request to clear the bit of the set of bits of the PKR entry, generate a page fault in response to the request originating in a page other than the trusted PKR update page of the memory.

2. The processor system of claim 1, wherein the memory management unit to, in response to the field that enables the trusted PKR update page enable being set, retrieve, from a register, an identifier of the trusted PKR update page.

3. The processor system of claim 2, wherein the register is a control register.

4. The processor system of claim 1, wherein the memory management unit to allow access to the trusted PKR update page via a branch from the page of the memory to support execution of the untrusted application in response to the branch being an ENDBRANCH instruction.

5. The processor system of claim 1, wherein the processor core to deny access to the trusted PKR update page via a branch from the page of the memory to support execution of the untrusted application in response to the branch landing on an instruction other than an ENDBRANCH instruction.

6. The processor system of claim 1, wherein the processor core to operate in a 64-bit mode to execute the untrusted application.

7. The processor system of claim 1, wherein the request to clear the bit of the set of bits of the PKR entry includes a request to clear one of an access disable bit, a write disable bit, or an execution disable bit.

8. A method to provide sandbox execution support for protection key rights attacks, the method comprising:
    designating, by a memory management unit, a page of a memory to support execution of an untrusted application;
    executing, by a processor core, a task associated with the untrusted application using the designated page of the memory;
    storing a page table entry associated with a page of the memory, the page table entry including a protection key field that identifies a location of a protection key right (PKR) entry and a field that enables a trusted PKR update page of the memory, the PKR entry including a set of bits;
    receiving a request to clear a bit of the set of bits of the PKR entry; and
    in response to the request to clear the bit of the set of bits of the PKR entry, generating a page fault in response to the request originating in a page other than the trusted PKR update page of the memory.

9. The method of claim 8, further comprising, in response to the field that enables the trusted PKR update page enable being set, retrieving, from a register, an identifier of the trusted PKR update page.

10. The method of claim 9, wherein the register is a control register.

11. The method of claim 8, further comprising allowing access to the trusted PKR update page via a branch from the page of the memory to support execution of the untrusted application in response to a target of the branch target being an ENDBRANCH instruction.

12. The method of claim 8, further comprising denying access to the trusted PKR update page via a branch from the page of the memory to support execution of the untrusted application in response to the branch landing on an instruction other than an ENDBRANCH instruction.

13. The method of claim 8, wherein the processor core to operate in a 64-bit mode to execute the untrusted application.

14. The method of claim 8, wherein the request to clear the bit of the set of bits of the PKR entry includes a request to clear one of an access disable bit, a write disable bit, or an execution disable bit.

* * * * *